United States Patent Office 3,637,774
Patented Jan. 25, 1972

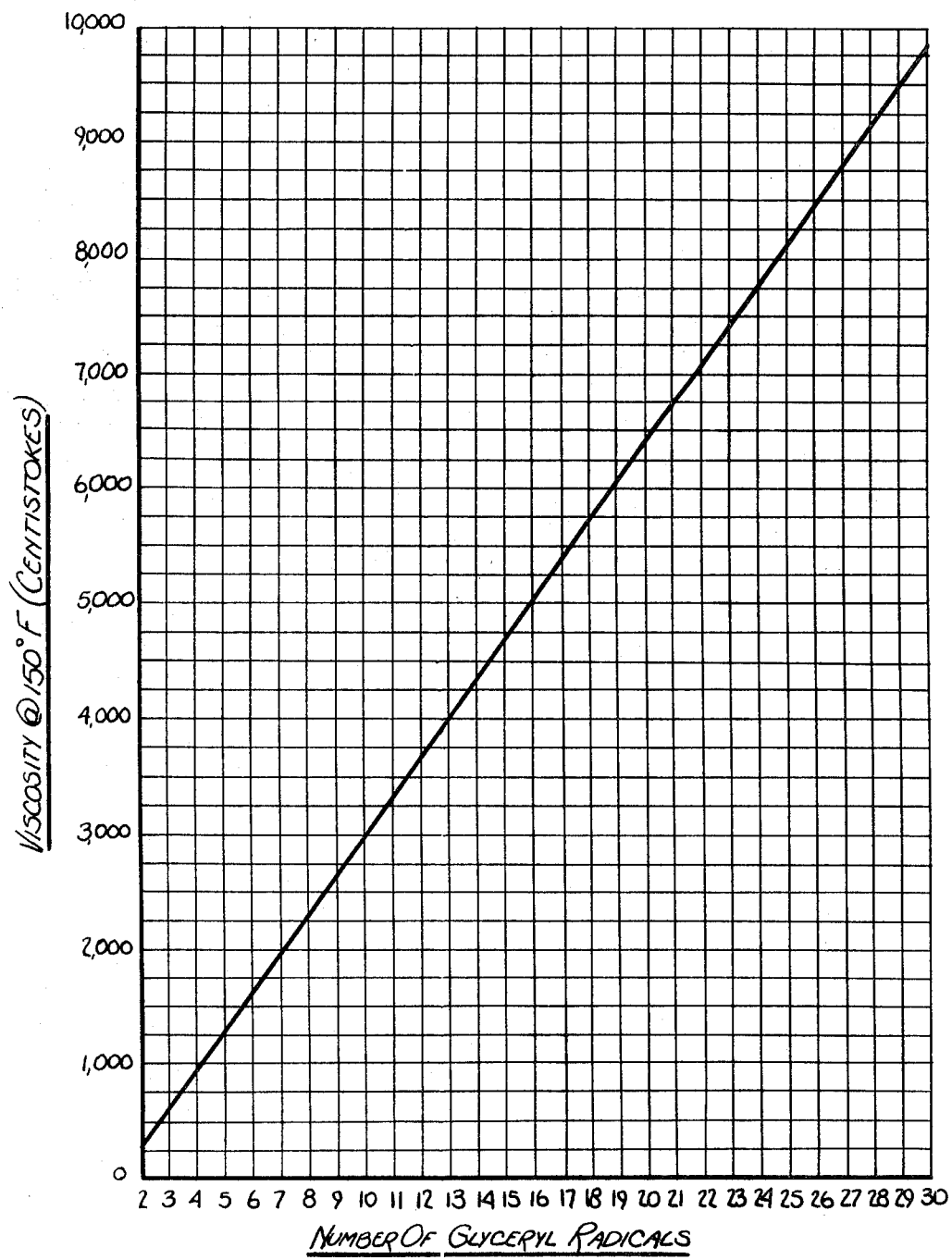

3,637,774
PROCESS FOR PREPARATION AND PURIFICATION OF POLYGLYCEROLS AND ESTERS THEREOF
Vigen K. Babayan, 374 W. Northfield Road, Livingston, N.J. 07039, and Henry Lehman, 51 Longview Road, Cedar Grove, N.J. 07009
Continuation of application Ser. No. 610,454, Jan. 19, 1967, which is a continuation of application Ser. No. 363,755, Apr. 29, 1964, which in turn is a continuation-in-part of applications Ser. No. 149,477, Oct. 5, 1961, and Ser. No. 357,258, Apr. 3, 1964. This application Nov. 3, 1969, Ser. No. 871,584
Int. Cl. C07c 4/12, 69/30, 67/06
U.S. Cl. 260—410.6   8 Claims

ABSTRACT OF THE DISCLOSURE

The present invention is directed to polyglycerols and derivatives thereof and to novel compositions containing these compounds. It includes a novel procedure for decolorizing and deodorizing the polyglycerols and fatty acid esters thereof. More particularly, this invention relates to processes for the preparation of polyglycerols and derivatives thereof and to the use of these compounds over a broad spectrum of industrial and edible applications.

---

Esters of polyglycerols of higher fatty acids have been used principally in the food field as emulsifying agents in margarine and other fatty foods. The general purpose thereof was to minimize the spattering of fat in frying operations. Such polyglycerol esters were unsuitable for direct use in edible products. The color thereof was relatively dark, the composition of the polyglycerols was indefinite, the product had an unpleasant odor and quite an undesirable taste. A usual bleaching operation on the crude polyglycerols was ineffective to eliminate these deficiencies. In addition to food uses, polyglycerol esters have also been suggested for use as emulsifying agents, wetting agents, softening agents in the textile industry, for use in insecticidal compositions and in rust preventive compositions. Despite the numerous suggestions in the prior art for the application of polyglycerol and polyglycerol esters, little if any commercialization has taken place due not only to prior art defects in the method for the preparation of the compounds, but also due to inability to control the reaction to produce a desired polyglycerol or class of polyglycerols free from a host of other polymer products which do not possess the desired properties.

The present application is a continuation of Ser. No. 610,454, filed Jan. 19, 1967, which in turn is a continuation of Ser. No. 363,755, filed Apr. 29, 1964, which in turn is a continuation-in-part of Ser. Nos. 357,258, filed Apr. 3, 1964 and 149,477 filed Oct. 5, 1961, all of which are now abandoned.

In these applications there is set forth a proces for the preparation of polyglycerols and polyglycerol esters whereby the prior art defects associated with the production of polyglycerols and polyglycerol esters are overcome. Essentially this process involves the intercondensation of glycerol in the presence of an alkaline catalyst in an anhydrous medium at a temperature above 100° C. thereby continuously distilling off the water formed during the intercondensation reaction. After the reaction mass has cooled, it is diluted with water and a bleaching agent introduced into the reaction medium, the temperature is maintained below 100° C. for a period of time sufficient to bleach the product, and then filtered. The time of bleaching may vary over a wide range but is generally between about one-half hour and 24 hours. The product obtained is one which has not only been bleached but which has substantially all of the undesired odors eliminated.

The alkaline catalyst may be any of the conventional catalysts employed in this reaction such as sodium hydroxide, potassium hydroxide, alkali metal alcoholates, sodium acetate, metal oxides, etc., and is employed in amounts up to about 2%. Of course by using higher temperatures and longer reaction times, the use of a catalyst may be eliminated. While it is essential that the reaction take place above 100° C. we have generally found it suitable to maintain the temperature range between about 100° C. and 300° C. and usually within the range of about 200 to 270° C. The amount of water to be added to the polyglycerol which has been formed may vary over a wide range from about one-third as much as the polyglycerol formed during the reaction to as much as several times the amount of polyglycerol formed during the reaction, but is generally within the range of about 50% to 100% of the amount of polyglycerol formed in the reaction. The amount of bleaching agent may vary between about 1 and 15% and preferably between 1 and 5%. The preferred bleaching agent is carbon black although other solid bleaching agents such as activated clays, bleach earths, etc. may be employed. Liquid bleaching agents such as hydrogen peroxide, sodium hypochlorites, etc., may be employed either separately or they may be added in conjunction with solid bleaching agents. When liquid bleaching agents are used alone, the results obtained are not as satisfactory as when a solid bleaching agent is employed. The temperature during the bleaching operation is maintained below 100° C. and generally within the range of about 70 to 90° C.

The preparation of polyglycerol polymers according to the above described process is illustrated by the following equation from which it will be noted that an ether linkage results for every three carbon atoms in the chain with splitting off of water.

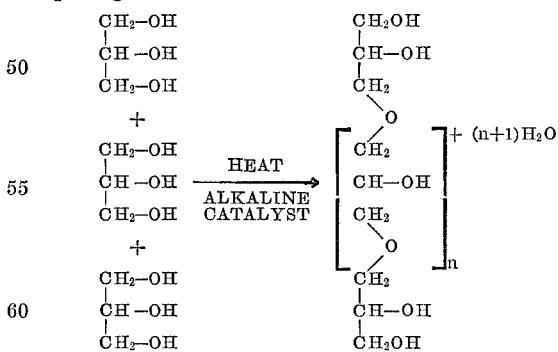

where $n$ is an integer from 0 to 28 or higher.

In carrying out the above described process, it has been found that by correlating the changes in the hydroxyl value and viscosity of the polyglycerols as they are formed during the course of the reaction, the reaction may be stopped at any point depending upon the degree of polymerization desired. In accordance with this procedure, polyglycerols ranging from diglycerol (2 glycerol radicals) to triacontaglycerol (30 glycerol radicals) or higher may be formed. It will be noted from Tables I and IA below and FIG. 1 that as the polymer chain length increases, such constants as molecular weight and viscosity also increase, whereas the hydroxyl value decreases. In view of this correlation between molecular weight, viscosity and hydroxyl values, we have found that the preparation of specific polyglycerol compositions may be prepared in good quantity utilizing the above mentioned chemical properties and correlating these properties with the properties shown in Tables I, IA and FIG. 1 referred to above. For example, if one wishes to prepare decaglycerol which has a mean molecular weight of 758 and a calculated hydroxyl value of 888, one would react 10 molecules of glycerin in accordance with the process described above and would during the course of the reaction periodically determine the viscosity and hydroxyl value of the reaction product. The reaction would be stopped when the hydroxyl value approaches the theoretical hydroxyl value of 888 and when the product has a viscosity of approximately 3,000 centistokes at 150° F. as shown in FIG. 1. Likewise, if one wanted to prepare triacontaglycerol, the same procedure would be carried out and the properties of the reaction product periodically determined until it was found to have a hydroxyl value in the range of the theoretical hydroxyl value of 802 and a viscosity in the range of about 9,800 centistokes at 150° F. It will thus be seen that by correlating the viscosity with the hydroxyl value, one can produce virtually any desired polyglycerol having between 2 and 30 glycerol radicals. Other properties such as refractive index and specific gravity may also be utilized in determining the end point of the reaction, particularly where the desired product is a polyglycerol of about 8 glycerol radicals or less. We have found that as the polymer chain length increases beyond about 8 glycerol radicals, the refractive index and specific gravity reach an asymptote and cannot be relied upon for determining the end point of the reaction.

TABLE I

| Polyglycerol | New molecular weight | Calculated hydroxyl value |
|---|---|---|
| Diglycerol | 166 | 1,352 |
| Triglycerol | 240 | 1,169 |
| Tetraglycerol | 314 | 1,071 |
| Pentaglycerol | 388 | 1,012 |
| Hexaglycerol | 462 | 970 |
| Heptaglycerol | 536 | 941 |
| Octaglycerol | 610 | 920 |
| Nonaglycerol | 684 | 903 |
| Decaglycerol | 758 | 888 |
| Undecaglycerol | 832 | 877 |
| Dodecaglycerol | 906 | 868 |
| Tridecaglycerol | 980 | 859 |
| Tetradecaglycerol | 1,054 | 852 |
| Pentadecaglycerol | 1,128 | 846 |
| Hexadecaglycerol | 1,202 | 840 |
| Heptadecaglycerol | 1,276 | 836 |
| Octadecaglycerol | 1,350 | 831 |
| Nonadecaglycerol | 1,424 | 828 |
| Eicosaglycerol | 1,498 | 825 |
| Heneicosaglycerol | 1,572 | 821 |
| Docosaglycerol | 1,646 | 818 |
| Tricosaglycerol | 1,720 | 816 |
| Tetracosaglycerol | 1,794 | 813 |
| Pentacosaglycerol | 1,868 | 812 |
| Hexacosaglycerol | 1,942 | 809 |
| Heptacosaglycerol | 2,016 | 807 |
| Octacosaglycerol | 2,090 | 805 |
| Nonacosaglycerol | 2,164 | 804 |
| Triacontaglycerol | 2,238 | 802 |

TABLE IA

| Compound | Molecular weight | Calculated hydroxyl value | Found, hydroxyl value | S.G. at 150° F. | S.G. at 180° F. | Viscosity, Cst. at 150° F. | Viscosity, Cst. at 180° F. | Refractive index at 60° C. | Color |
|---|---|---|---|---|---|---|---|---|---|
| Diglycerol | 166 | 1,352 | 1,320 | 1.256 | 1.246 | 287 | 110 | 1.4731 | Water white. |
| Triglycerol | 240 | 1,169 | 1,166 | 1.258 | 1.246 | 647 | 230 | 1.4798 | Do. |
| Tetraglycerol | 314 | 1,071 | 1,082 | 1.262 | 1.251 | 1,067 | 340 | 1.4826 | Do. |
| Pentaglycerol | 388 | 1,012 | 1,028 | 1.263 | 1.252 | 1,408 | 430 | 1.4856 | Do. |

The polyglycerols formed by the above process may be esterified with fatty acids having from about 2 to about 24 carbon atoms such as acetic, caproic, lauric, oleic, stearic, behenic, and linoleic, etc. may be used. The esters may be formed either by means of a direct esterification or by means of a transesterification reaction using conventional transesterification catalysts. Either partial or completely esterified products may be obtained depending upon the ratios of fatty acids employed in the reaction. In the preparation of industrial products, we have found it to be easier and more expedient to prepare the esters by transesterification rather than the direct esterification method. This is particularly so where the mixed fatty acids of a given oil are desired. We have found that transesterification produces the desired results both economically and easily. Table II below presents a tabulation of some typical polyglycerol esters which were prepared by transesterification of the glycerol oil containing mixed fatty acids and the respective polyglycerol. Neither the chain length of the polyglycerol nor the type of oil used affect the smooth reaction. The appropriate fat or oil is reacted with the proper amounts of the appropriate polyglycerol to obtain the desired polyglycerol ester.

TABLE II.—TYPICAL EXAMPLES OF PARTIAL ESTERS PREPARED BY TRANSESTERIFICATION

| Compound | A# | Sap. # | OH # | pH (3% sol.) | Percent mono glyceride | Percent free glycerine | Iodine value |
|---|---|---|---|---|---|---|---|
| Triglycerol mono cottonseed oil | 6.2 | 133.1 | 308.4 | 5.1 | 21.3 | 3.0 | 74.6 |
| Triglycerol mono palm oil | 5.4 | 132.2 | | 5.0 | 26.3 | 2.8 | 38.9 |
| Triglycerol mono shortening oil | 4.8 | 130.1 | 327.8 | 6.1 | 21.7 | 3.2 | 41.3 |
| Pentaglycerol di tallow oil | | 163.0 | | 6.8 | 18.5 | 2.2 | |
| Pentaglycerol di shortening oil | 1.8 | 121.9 | 361.5 | | 20.3 | 3.3 | 39.6 |
| Hexaglycerol sesqui palm oil | 0.6 | 106.5 | 369.7 | 7.7 | | | 28.3 |
| Hexaglycerol di shortening oil | 4.4 | 128.3 | 303.3 | 6.1 | 14.4 | 2.0 | 47.4 |
| Hexaglycerol di cottonseed oil | 7.0 | 126.5 | | 5.3 | 17.6 | 3.0 | 73.4 |
| Hexaglycerol di peanut oil | 4.8 | 123.8 | 297.5 | 5.7 | 12.5 | 1.8 | 58.8 |
| Nonaglycerol tri peanut oil | 5.6 | 120.0 | 299.1 | 5.2 | 10.9 | 1.7 | 58.6 |
| Nonaglycerol tri shortening oil | 6.0 | 122.4 | 296.8 | 5.9 | 10.8 | 1.7 | 46.6 |
| Decaglycerol mono corn oil | 7.4 | 88.8 | | 4.7 | 11.8 | 4.9 | 52.4 |
| Decaglycerol di shortening oil | 0.4 | 92.7 | 364.7 | 6.4 | 7.3 | | |
| Decaglycerol di palm oil | 2.0 | 83.9 | 413.1 | | 8.2 | | |
| Decaglycerol tri peanut oil | 7.6 | 121.6 | 305.5 | 4.6 | 11.6 | 1.9 | 54.6 |
| Decaglycerol tri cottonseed oil | 7.2 | 117.3 | | 6.1 | 14.3 | 3.4 | 64.3 |
| Decaglycerol tri shortening oil | 6.6 | 121.4 | 293.1 | 5.3 | 10.1 | 1.5 | 44.2 |
| Decaglycerol tetra cottonseed oil | 5.2 | 128.2 | 262.0 | 6.0 | | | |
| Decaglycerol penta cottonseed oil | 6.4 | 136.2 | 237.3 | 5.9 | | | |
| Decaglycerol penta shortening oil | 5.6 | 138.5 | 104.1 | 6.1 | | | |
| Triacontaglycerol deca peanut oil | 6.8 | 120.6 | 296.2 | 5.2 | 10.2 | 1.6 | 55.8 |

Table III below sets forth physical and chemical characteristics of some typical polyglycerol partial esters prepared from specific fatty acids and the appropriate polyglycerol.

Complete simple esters of polyglycerols may also be formed by reacting an excess of the appropriate fatty acid with the polyglycerol.

TABLE III.—PHYSICAL AND CHEMICAL CHARACTERISTICS OF TYPICAL POLYGLYCEROL ESTERS

| Chemical Identity | Color, Gardner | Hydroxyl value | Sap. No. | Iodine value | FFA | Form | Specific gravity | Melting point |
|---|---|---|---|---|---|---|---|---|
| Decaglycerol monolaurate | 9+ | 690 | 58.7 | 2.3 | 1.0 | Viscous liquid | 1.15 | (¹) |
| Decaglycerol monomyristate | 11+ | 577 | 70.3 | 2.5 | 0.8 | Semisolid | 1.11 | 13.8 |
| Decaglycerol monopalmitate | 10+ | 583 | 63.7 | 2.5 | 0.9 | do | 1.05 | 37.5 |
| Decaglycerol monostearate | 13 | 598.8 | 70.8 | 2.4 | 0.5 | do | 1.04 | 51.9 |
| Decaglycerol monooleate | 11+ | 567 | 68.2 | 27.3 | 0.7 | Viscous liquid | 1.13 | (¹) |
| Decaglycerol tristearate | 13+ | 282.7 | 121.8 | 1.7 | 1.2 | Waxy solid | 1.03 | 51.6 |
| Decaglycerol tetraoleate | 7− | 246.5 | 141.3 | 55.1 | 3.7 | Liquid | 1.00 | (¹) |
| Decaglycerol hexaoleate | 10 | 148.1 | 153.9 | 63.8 | 2.2 | do | 0.97 | (¹) |
| Decaglycerol octaoleate | 6 | 83.2 | 168.0 | 68.9 | 5.7 | do | 0.95 | (¹) |
| Decaglycerol decastearate | 5+ | 47.8 | 169.8 | 2.0 | 8.1 | Waxy solid | 0.92 | 53.4 |
| Decaglycerol decaoleate | 6 | 32.3 | 177.9 | 70.6 | 5.8 | Liquid | 0.94 | (¹) |
| Decaglycerol decalinoleate | 7 | 26.8 | 148.7 | 123.6 | 4.9 | do | 0.94 | (¹) |
| Hexaglycerol monostearate | 12 | 431 | 78.0 | 3.0 | 2.0 | Waxy solid | 0.99 | 52.2 |
| Hexaglycerol monooleate | 8− | 481 | 82.0 | 33.0 | 5.0 | Viscous liquid | 1.07 | (¹) |
| Hexaglycerol dioleate | 9 | 343 | 130.0 | 51.0 | 1.6 | Liquid | 1.01 | (¹) |
| Hexaglycerol hexaoleate | 5− | 65 | 177.1 | 71.7 | 4.7 | do | 0.93 | (¹) |
| Triglycerol monostearate | 8 | 325 | 125.1 | 2.5 | 4.1 | Waxy solid | 1.03 | 52.5 |

¹ Below zero.

In Table IIIA below are shown solubilities of several polyglycerol esters referred to in Tables II and III above.

TABLE IIIA.—POLYGLYCEROL ESTERS—SOLUBILITY DATA

| Product | Water | | | Alcohol U.S.P. | | | Peanut Oil | | |
|---|---|---|---|---|---|---|---|---|---|
|  | 1% | 5% | 10% | 1% | 5% | 10% | 1% | 5% | 10% |
| Triglycerol monostearate | D | D | D | D | D | D | D | D | D |
| Triglycerol mono shortening | D | D | D | S | S | S | D | D | D |
| Hexaglycerol dioleate | D | D | D | S | S | S | D | D | S |
| Hexaglycerol di shortening | D | D | D | S | SH | SH | D | D | S |
| Hexaglycerol hexaoleate | I | I | I | I | I | I | S | S | S |
| Decaglycerol monooleate | D | D | D | S | S | S | I | I | I |
| Decaglycerol monolaurate | S | S | S | S | S | S | I | I | I |
| Decaglycerol tri shortening | D | D | D | S | SH | SH | D | D | S |
| Decaglycerol tristearate | D | D | D | D | D | D | PD | PD | PD |
| Decaglycerol decastearate | I | I | I | I | I | I | SH | SH | SH |
| Decaglycerol decaoleate | I | I | I | I | I | I | S | S | S |

NOTE.—S=Soluble; PD=Partly Dispersible; SH=Soluble Hot; I=Insoluble; D=Dispersible.

Table IV below sets forth physical and chemical characteristics of complete simple esters of triglycerols using various fatty acids.

TABLE IV.—PHYSICAL AND CHEMICAL PROPERTIES OF TYPICAL TRIGLYCEROL SIMPLE ESTERS

| Acid | A # | Sap. # | Smoke, °F. | Flash, °F. | Fire, °F. | Specific gravity 25/15° C. | Viscosity, cps., Brookfield, spindle #1, 59° C. | | | |
|---|---|---|---|---|---|---|---|---|---|---|
|  |  |  |  |  |  |  | 6 r.p.m | 12 r.p.m | 30 r.p.m | 60 r.p.m |
| Isopentanoic | 1.0 | 428.7 | 275 | 485 | 530 |  | 6 | 9.5 | 10.8 | 12.4 |
| 2-methyl pentanoic | .12 | 378.7 | 290 | 410 | 440 | 1,010 | 7 | 10 | 11.2 | 12.5 |
| 2-ethyl hexanoic | .90 | 261.3 | 305 | 465 | 480 | 0.978 | 11 | 13.5 | 15.2 | 16.5 |
| Caprylic | .14 | 324.1 |  | 475 | 505 | .997 | 15 | 15 | 16 | 17 |
| Pelargonic | .15 | 318.5 | 365 | 520 | 550 | 0.967 | 15 | 15.5 | 17.2 | 18.4 |
| iso-Octanoic | 1.40 | 147.5 | 305 | 480 | 510 | 0.982 | 20 | 21.5 | 22.2 | 23.0 |
| iso-Decanoic | 1.00 | 27.91 | 335 | 495 | 540 | 0.959 | 22 | 23 | 25 | 26.5 |
| 2-ethyl butyric | .30 | 312.7 | 265 | 445 | 485 | 1.09 | 36 | 36.5 | 33.0 | 30.7 |
| Acetic | .4 | 644.7 |  | 405 | 420 |  | 15 | 18 | 30 | 32 |

Table V below sets forth physical and chemical characteristics of complete simple esters of hexaglycerol using various fatty acids.

TABLE V.—PHYSICAL AND CHEMICAL PROPERTIES OF TYPICAL TRIGLYCEROL SIMPLE ESTERS

| Acid | A # | Sap. # | Smoke, °F. | Flash, °F. | Fire, °F. | Specific gravity 25/15° C. | Viscosity, cps., Brookfield, spindle #1, 59° C. | | | |
|---|---|---|---|---|---|---|---|---|---|---|
|  |  |  |  |  |  |  | 6 r.p.m. | 12 r.p.m. | 30 r.p.m. | 60 r.p.m. |
| Isopentanoic | .20 | 388.6 | 305 | 465 | 485 | 1.051 | 17 | 18.5 | 21 | 21.8 |
| 2-methyl pentanoic | 1.3 | 351.6 | 240 | 405 | 430 | 1.092 | 19 | 20 | 21.2 | 22.6 |
| Caprylic | .08 | 311.9 |  | 510 | 535 | .988 | 20 | 20.5 | 23.0 | 24.5 |
| 2-ethyl hexanoic | .18 | 267.2 | 305 | 485 | 500 | .988 | 25 | 25.5 | 27 | 27.7 |
| Pelargonic | 1.6 | 293.9 | 360 | 520 | 550 | .983 | 25 | 25 | 26 | 26.8 |
| 2-ethyl butyric | 1.0 | 318.2 | 300 | 460 | 485 | .988 | 30 | 32.5 | 34 | 35.5 |
| iso-Decanoic | .10 | 267.6 | 320 | 510 | 550 | .981 | 38 | 40 | 41 | 42.4 |
| iso-Octanoic | .40 | 304.1 | 325 | 500 | 525 | 0.999 | 40 | 42.5 | 43.2 | 44.5 |
| Acetic | .7 | 584.1 | 225 | 445 | 465 |  | 67 | 72 | 73 | 73.6 |

Table VI below sets forth physical and chemical characteristics of complete simple esters of decaglycerol using various fatty acids.

II, III and IIIA may also be used in cosmetic formulations such as hand creams, hair lotions, vanishing creams, hair conditioners, all purpose creams, etc. and in certain phar-

TABLE VI.—PHYSICAL AND CHEMICAL PROPERTIES OF TYPICAL TRIGLYCEROL SIMPLE ESTERS

| Acid | A # | Sap. # | Smoke, °F. | Flash, °F. | Fire, °F. | Specific gravity 25/15° C. | Viscosity, cps., Brookfield, spindle #1, 59° C. | | | |
|---|---|---|---|---|---|---|---|---|---|---|
| | | | | | | | 6 r.p.m. | 12 r.p.m. | 30 r.p.m. | 60 r.p.m. |
| 2-methyl pentanoic | .90 | 320.4 | 220 | 420 | 430 | 1.038 | 27 | 28 | 29.8 | 30.4 |
| Caprylic | .06 | 305.2 | | 510 | 540 | 0.997 | 28 | 30 | 32.2 | 33.6 |
| Pelargonic | 1.8 | 276.3 | 330 | 505 | 555 | .992 | 35 | 37 | 38.2 | 39.1 |
| 2-ethyl hexanoic | .5 | | 325 | 495 | 525 | 0.999 | 39 | 40 | 41.6 | 42.6 |
| Isopentanoic | .4 | 285.6 | 255 | 440 | 465 | 1.070 | 40 | 42.5 | 43 | 44.5 |
| 2-ethyl butyric | 1.2 | 432.8 | 285 | 475 | 595 | 1.040 | 45 | 48 | 50 | 51 |
| iso-Octanoic | .4 | 295 | 280 | 495 | 525 | 1.005 | 64 | 65 | 67 | 67.2 |
| iso-Decanoic | .4 | 254 | 365 | 535 | 575 | 0.982 | 75 | 73 | 76 | 76.6 |
| Acetic | .5 | 534.6 | 230 | 415 | 445 | | 160 | 162.5 | 162.5 | 220 |

Of course mixed esters may be prepared not only from the mixed polyglycerols but from mixtures of fatty acids. Such mixtures appear to have certain advantages such as low viscosity and low freezing points pointing to their special industrial applications.

Thus products may be prepared according to the above described process which will cover the entire range of hydrophilic-lipophilic characteristics. These polyglycerol esters may be partial or completely esterified esters and depending upon the chain length of polyglycerol molecule, may be solid or liquid; saturated or unsaturated; aliphatic or aromatic; mono- di- or polycarboxylic acid esters; mono-, di- or polyesters of the polyglycerol; single or mixed acid esters; high or low molecular weight; water or oil soluble. The short and medium chain length acids generally give water soluble esters while the longer chain length acids generally give water dispersible esters when the mono and di esters of polyglycerols are formed. As the number of hydroxyls are progressively esterified, the products formed become progressively lipophilic and essentially oil soluble in all proportions.

The polyglycerols identified in Table I have been found to be eminently suitable for such uses as gelling agents, humectants, viscosity improvers, lubricants, chemical intermediates, solubilizers, adhesives, cross-linking agents, plasticizers, photographic agents, etc.

Polyglycerol esters such as those set forth in Tables II, III and IIIA have also been found to be particularly suitable for use in edible products such as ice creams, margarines, shortenings, peanut butter, confectionery coatings, frozen desserts, whipped toppings, vegetable fat coffee cream and bakery products. We have found for example that polyglycerol esters incorporated in peanut butter overcome the sticking of the peanut butter to the roof of the mouth and avoid the separation of oil from the peanut butter. Moreover, the polyglycerol esters improve the spreading characteristics of peanut butter on bread and crackers. We have also found that shortenings prepared for cake mixes in which the emulsifying agents are polyglycerol esters, produce cakes with greater volume, better water absorption, good grain and texture and good shelf-life. For example, in a comparative test, two fillings were prepared each containing 30% shortening and 20% water using regular production procedures. In one filling, the shortening used was regular commercial emulsified shortening recommended for fillers. For the other, the shortening was prepared containing pentaglycerolmonooleate and specially prepared mono and di-glycerides of vegetable fat. The filling containing the regular emulsified shortening had a specific gravity of 0.6 whereas the filling containing the polyglycerol esters had a specific gravity of 0.50. The two fillings were stored in an incubator at 100° F. for 48 hours. At the end of this time, the filling containing the regular emulsified shortening lost its creamy consistency and had badly separated, whereas the filling containing the shortening prepared with the polyglycerol esters retained its creamy consistency and had not separated.

The polyglycerol esters such as those set forth in Tables maceutical applications. The specific uses depend upon the particular polyglycerol or the oil or fatty acid employed in the preparation of the polyglycerol esters. For example, when using a liquid oil such as cottonseed, peanut, corn and soya or the fatty acids from these oils as such, or fatty acids such as oleic, linoleic, there is produced a polyglycerol ester which is liquid and admirably suited for an emulsifier for ice cream production. The fact that the emulsifier is liquid and may be used by direct addition to the mix as the ice cream is being produced is of considerable advantage to the present trend and practice of making ice cream and ice cream type products.

When the polyglycerol ester is prepared from partially hydrogenated oils or admixtures of saturated and unsaturated fatty acids such as a shortening base or a margarine base oil, then the resulting product is admirably suited for emulsifier use in such diversified uses as margarine, shortening, intravenous injection emulsions, etc.

When the polyglycerol ester is prepared from completely or almost completely saturated oils or fatty acids, then the resulting product appears to be admirably suited for creams, ointments, viscous pastes, etc. This type of product is also admirably suited where shelf life at elevated temperature is required for emulsions regardless of how thick or thin their fluidity may be.

In the use of such polyglycerol esters for intravenous injection emulsions they have proven to possess unique properties with respect to the serum pattern of the blood. Where many other emulsifiers which have been tried give good emulsions they apparently affect the serum pattern when they are introduced into the blood stream. The polyglycerol esters of this invention appear to have no altering effect on the serum pattern while performing their function as emulsifiers. For this reason this type of product is preferred in intravenous injection work.

The amounts of polyglycerol esters used in the various compositions will vary over a wide range depending upon the ultimate use of the composition. Generally we find that good results are obtained when about 0.01 to 5.0% of the polyglycerol esters are incorporated in the compositions and that from about 0.12 to about 0.18% is particularly suitable for use in bake mixes and intravenous injections. Polyglycerol esters incorporated in confectionary coatings at a level of approximately 1 to 2% of the finished coating have been shown to enhance the gloss properties of such coatings and to maintain such gloss characteristics in extended shelf life studies.

The following illustrate the use of polyglycerol esters in various applications.

Pentaglycerol monoleate in icing shortening

The following composition, in parts by weight:

| | |
|---|---|
| Glyceride fat shortening | 113 |
| Pentaglycerol monoleate | 2 |
| Marshmallow | 48 |
| Sugar | 187 |
| Skim milk powder | 33 | is mixed with 96 parts of cold water over a period of over 30 minutes at various speeds in a high speed mixer. The composition has a specific gravity of about .42 to .50 and the icing is firm.

Tetraglycerol mono-cottonseed oil ester in candy coatings

The following compositions are in parts by weight:

|  | 2% liquor | 4% liquor |
|---|---|---|
| Hard butter | 195 | 190 |
| Chocolate liquor | 10 | 20 |
| Lecithin | 1.25 | 1.25 |
| Tetraglycerol mono-cottonseed | 3 | 3 |
| Cocoa Powder | 44 | 43 |
| Sugar | 196 | 193 |
| Skim milk powder | 44 | 43 |

Triglycerol monohydrogenated cottonseed ester in cake mix

The dry ingredients by weight are as follows:

| Cake flour | 300 |
|---|---|
| Sugar | 390 |
| Salt | 10 |
| Skim milk powder | 30 |
| Baking powder | 18 |

740 parts of the above are mixed with 150 parts of cold water, 109 parts of glyceride fat and 11 parts of the above ester in a suitable mixer, after which 120 parts of water and 200 parts of egg are added over several minutes. The batter is then baked for 22 to 25 minutes at about 350° F.

All vegetable ointment base

| A | Percent |
|---|---|
| Modified coconut triglyceride | 45 |
| Tripalmitin | 6 |
| Decaglycerol decalinoleate | 5 |
| Decaglycerol decastearate | 5 |

(B)

| Water | 39 |
|---|---|
| Perfume and preservative | q.s. |

The formula may be prepared as follows: Heat the oil and water phases separately to 165° F. Add the water to the oil phase with thorough agitation. Cool with mixing and homogenize.

The above formula is unique in that this is a pharmaceutical ointment base composed entirely of edible products of vegetable origin.

It is well known that emulsifiers interfere with bacteriostats of the bis-phenol type or of the alkyl para-hydroxybenzoates. Experiments employing zone of inhibition tests were carried out to compare several of the polyglycerol esters with other non-ionic surfactants. These tests were run using a 0.5% alcoholic solution of hexachlorophene (G-11) with eight different emulsifiers at concentrations up to 2%. Test organisms include two gram negative bacteria (*Escherichia coli* and *Pseudomonas seruginosa*) and a mold (*Aspergillus niger*). The results of these tests are set forth below:

A typical formulation employing polyglycerol esters and bacteriostats is the following:

Deodorant cream (vanishing type)

| (A) | Percent |
|---|---|
| Decaglycerol decalinoleate | 1 |
| Decaglycerol monolaurate | 2 |
| Isopropyl myristate | 2 |
| Cetyl alcohol | 4 |
| Stearic acid T.P. | 18 |
| Spermaceti | 2 |
| G-11 | 0.5 |

(B)

| Glycerine | 4 |
|---|---|
| Water | 66.5 |
| Perfume and preservative | q.s. |

The formula may be prepared as follows: Heat A and B separately to 170° F. Add A to B with thorough agitation. Cool to 120° F., add the perfume; continue cooling with agitation to 100° F.

Polyglycerol esters may also be used as gelling agents for mineral oils, vegetable oils and glycols. The stearates have been found to be particularly effective for this use. For instance, decaglycerol monostearate will gel mineral oil and the resulting gel can be readily rinsed with water. Other decaglycerol stearates from the tristearate on up are waxy and are suitable for use in tablets as coatings, lubricants, etc. Materials such as decaglycerol tristearate and polyglycerol oleates are also recommended for self-emulsifying waxes. The addition of hexaglycerol monooleate to mineral oil will result in a clear oil which is readily rinsed off the hands with water. Other esters such as decaglycerol tetraoleate can be used in a similar fashion with vegetable oil.

For example, we have found that the triglycerol pentaacetate, hexaclycerol octaacetate, and decaglycerol dodecaacetate when used at levels of 15% with natural rubber or a standard SBR (#1502) type rubber were suitable as polymeric, primary plasticizers which imparted very good low temperature characteristics to the rubber while increasing the modulus 20% and tensile by 40% over the controls. Furthermore, the pentaglycerol pentaacetate appeared to show additional advantages as a reinforcing agent and an accelerator.

On the same type of system, the substitution of the corresponding isopentanoate, caprylate and pelargonate polyglycerol esters were found to be equally suitable. These esters consist of triglycerol pentaisopentanoate, triglycerol pentapelargonate, triglycerol pentacaprylate, decaglycerol dodecapelargonate and hexaglycerol octacaprylate. Dioctophthalate which was used as the control, was inferior to the above polyglycerol esters.

Other members of the homologous series of completely esterified polyglycerol esters such as hexaglycerol octacaprylate, hexaglycerol octapelargonate, decaglycerol dodecacaprylate or decaglycerol pelargonate were found to be excellent high temperature lubricants which were suitable for automotive and aviation uses. High thermal and

|  | E. coli | | | | Ps. aeroginosa | | | | A. niger | | | |
|---|---|---|---|---|---|---|---|---|---|---|---|---|
|  | Concentration of emulsifier used | | | | | | | | | | | |
|  | 0 | 0.5% | 1.0% | 2.0% | 0 | 0.5% | 1.0% | 2.0% | 0 | 0.5% | 1.0% | 2.0% |
| Emulsifier: | | | | | | | | | | | | |
| POE sorbitan mono oleate | 7 | — | — | — | 5 | — | — | — | 8 | — | — | — |
| POE sorbitan mono laurate | 5 | — | — | — | — | — | — | — | — | — | — | — |
| POE (39) stearate | — | — | — | — | — | — | — | — | — | — | — | — |
| POE (23) lauryl alcohol | — | — | — | — | — | — | — | — | — | — | — | — |
| Decaglycerol mono oleate [1] | 10 | 12 | 10 | — | 3 | 2 | — | — | 6 | 6 | 6 |
| Decaglycerol mono laurate [1] | 15 | 15 | 10 | — | 5 | 3 | 2 | — | 6 | 8 | 7 |
| Decaglycerol monopalmitate [1] | 12 | 8 | 10 | — | 5 | 2 | 1 | — | 6 | 6 | 7 |
| Hexaglycerol mono oleate [1] | 20 | 10 | 5 | — | 5 | 1 | — | — | 9 | 7 | 3 |

[1] No precipitate occurred in alcohol at these concentrations of emulsifier.

NOTE.—All tests were run using 0.5% G-11 in alcoholic solution, with and without emulsifiers;—indicates no inhibition; numbers indicate the zone of inhibition in mm.

oxidative stability coupled with suitable viscosity over a wide range of temperature make such esters suitable for the exceptional rigid and severe conditions encountered in such applications.

Greases prepared from such polyglycerol complete esters when tested against the standard dicarboxylic acid-glycol esters of petroleum base greases showed improved body, strength and shear stability over the latter type of compounds. In this area of use some oleic or tallow esters of the polyglycerols appear to give greater mobility, particularly when preparing the lithium type greases. Still other members of the homologous series of polyglycerol esters such as triglycerol pentacaprylate or triglycerol pentaisopentanoate when formulated into a synthetic fiber finish for nylon, demonstrate exceptionally good slip and lubricating characteristics as well as thermal stability and good color when subjected to the temperatures for processing nylon fibers. In contrast mineral oil, mono- or di-hydric alcohol esters were inferior not only in lubricating characteristics but in thermal stability, flash fire and smoke characteristics and color stability.

Still other members of the homologous series of completely esterified polyglycerol esters such as triglycerol isodecanate, hexaglycerol octaacetate or decaglycerol 2-ethyl butyrate were used on polymer surfaces such as polyethylene and found to be quite suitable as slipping agents and increasing the surface lubrication of the polymer setting.

When paint and dye pigments were ground and dispersed in such complete polyglycerol esters as triglycerol 2-methylpentanoate or triglycerol acetate on a 3-roll paint mill, it was found that such esters were able to wet out and carry much higher amounts of the pigment or dye than the customary dye esters used for this purpose. This wetting and dispersing characteristic may be utilized to good advantage in the printing ink, paint and allied fields.

Partial polyglycerol esters prepared from mono-, di- and polyunsaturated fatty acids have been found to be particularly satisfactory for use in such areas as adhesives, paints, and varnishes, protective coatings, urethane foam emulsions, dispersions and many allied fields. This utility is believed to be due to the multiple double bonds as well as the free hydroxyls of the polyglycerol which permit utilization as functional groups or as reactants for the production of other derivatives. These properties may be seen from the data in Table VII below which show the physical properties of some typical polyglycerol esters which have been found to be particularly suitable in the paint and varnish, and urethane industries.

For example these partial polyglycerol esters may be incorporated in paint and varnish formulations to form stable oil-in-water emulsions and to facilitate the dispersion of the pigment throughout the paint.

We have also found certain polyglycerol esters to be good base materials for reaction with isocyanates to form urethane foams. These polyglycerols also eliminate the need for cross linking agents. Urethane foams of very high molecular weight are possible through the oxidative and thermal polymerization of the double bonds of the fatty acids used in such esters.

These polyurethane foams may be formed by any of the conventional methods by which urethanes are produced. For example, depending upon the type of polyurethane foam desired, the polyglycerol starting material may be used per se or it may be reacted with various alkylene oxides such as ethylene oxide or butylene oxide, etc., various unsaturated acids or oils to produce a product having the desired hydroxyl number. These polyglycerol products may then be reacted with isocyanates such as toluene diisocyanate to form the desired polyurethane. A typical formulation for producing a semi-rigid polyurethane foam is the following:

| Ingredients | Weight (in grams) |
|---|---|
| Decaglycerol tetraoleate (hydroxyl No. 264.3) | 100 |
| Water | 3.6 |
| Toluene diisocyanate | 78.4 |
| Triethylenediamine | .15 |
| Stannous octoate | .4 |
| Silicone (L-520) | 1.00 |

Polyglycerol esters may also be halogenated so that they may be used by themselves or in conjunction with other materials to produce a flameproof or flame retardant urethane foam.

The halogenation may be carried out by conventional procedures to form compounds having the following generic formula:

$$CH_2ORCHORCH_2O[CH_2-CHOR-CH_2-O]_nCH_2CHORCH_2OR$$

wherein R is a radical selected from the group consisting of hydrogen, halogen, acyl radicals of a carboxylic acid having between 2 and 24 carbon atoms and halogenated acyl radicals of a carboxylic acid having between 2 and 24 carbon atoms and wherein at least one of said R groups is a compound selected from the group consisting of said halogen and said halogenated acyl radicals

TABLE VII

| Chemical identity | A # | Sap. # | Hydroxyl value | Iodine value | Viscosity at 163° F., cps. | Color, Gardner |
|---|---|---|---|---|---|---|
| Triglycerol monolinoleate | .4 | 145.0 | 368.9 | 105.7 |  | 5+ |
| Triglycerol pentalinoleate | 5.0 | 180.4 | 46.0 | 130.8 |  |  |
| Triglycerol monolinolinate | .4 | 111.0 | 334.9 | 102.8 | 322 | 11 |
| Triglycerol .5 linoleate | 2.4 | 129.5 | 393.5 | 90.8 | 106 | 7 |
| Triglycerol trilinoleate | 2.6 | 169.1 | 119.1 | 117.3 | 30.1 | 6 |
| Triglycerol tetraricinoleate | 3.2 | 172.5 | 175 | 87.2 | 86.6 | 11+ |
| Triglycerol .75 ricinoleate | 1.0 | 128.0 | 446.4 | 84.9 | 145 | 7 |
| Triglycerol .5 richinoleate | 2.2 | 123.9 | 480.1 | 82.1 | 138 | 8+ |
| Hexaglycerol .87 linoleate | 1.6 | 104.3 | 438.1 | 89.2 | 331 | 7 |
| Hexaglycerol 1.7 linoleate | 4.8 | 119.2 | 59.9 | 119.6 | 34.7 | 3 |
| Hexaglycerol .87 ricinoleate | 1.4 | 115.5 | 227.0 | 88.9 | 273 | 6 |
| Hexaglycerol 6.6 ricinoleate | 6.0 | 171.7 | 63.1 | 111.5 | 96.8 | 5 |
| Hexaglycerol .6 ricinoleate | 2.6 | 121.8 | 420.7 | 61.9 | 209 | 15+ |
| Hexaglycerol .8 ricinoleate | 2.4 | 103.9 | 470.5 | 80.0 | 1660 | 6 |
| Decaglycerol .9 ricinoleate | 1.8 | 85.8 | 486.9 | 64.7 | 3580 | 7 |
| Decaglycerol .8 ricinoleate | 3.8 | 53.1 | 284.2 | 32.3 | 4175 | 10 |
| Decaglycerol decalinoleate | 9.0 | 168.8 | 130.3 | 124 |  | 7 |
| Decaglycerol trilinoleate | 7.4 |  | 297.6 | 81.2 |  | 7 |
| Decaglycerol dilinoleate | 8.0 | 98.4 | 385.5 | 61.9 | 1525 | 12+ |
| Decaglycerol monoricinoleate | .4 | 83.4 | 452 |  |  | 12+ |
| Triglycerol 1.5 adipate | 2.0 |  | 791.1 |  | 1530 | 7-8 |
| Triglycerol 1.7 adipate | 1.0 |  | 850 |  | 1600 | 7-8 |
| Triglycerol monoadipate | 1.8 |  | 661.0 |  | 2200 | 10-11 | and wherein n is an integer from 0 to 28. Some halogenated polyglycerol esters which have been found to possess unique flame-retardant properties are set forth in Table VIII below.

Such hydroxy acid derivatives may be further modified by serving as intermediates for further reaction with other acids, alkyene oxides or metal salts.

The test methods employed throughout this specification

TABLE VIII.—CHLORINATED GLYCEROL ESTERS

| Compound | Original compound | | | | After chlorine addition | | | | | |
|---|---|---|---|---|---|---|---|---|---|---|
| | Mol wt. | Sap. | Hydroxyl value | Physical appearance | Percent chlorine calc. | Percent chlorine found | A # | Sap. # | Hydroxyl value | Physical appearance |
| Triglycerol monostearate | 484 | 125.1 | 325 | Waxy solid | 11.1 | 16.5 | 17.6 | 324.1 | 109.1 | Liquid. |
| Hexaglycerol monostearate | 726 | 78.0 | 431 | do | 10.5 | 14.6 | 21 | 292.8 | 126.6 | Semisolid. |
| Hexaglycerol distearate | 990 | 109.8 | 305 | do | | 11.2 | 28.8 | 419.8 | 149.3 | Solid. |
| Decaglycerol monopalmitate | 994 | 63.7 | 583 | Semisolid | 10.8 | 15.6 | 38 | 331.6 | 269.4 | Liquid. |
| Decaglycerol distearate | 1,284 | 98.2 | 431 | Waxy solid | 9.9 | 14.3 | 22 | 322.8 | 143.1 | Solid. |
| Decaglycerol tristearate | 1,548 | 121.8 | 282.7 | do | 6.85 | 10.5 | 26.6 | 265.6 | 131.7 | Waxy solid. |
| Decaglycerol decastearate | 3,400 | 169.8 | 47.8 | do | 14.3 | 15.3 | 38 | 255.5 | 37.3 | Liquid. |
| Decaglycerol tetraoleate | 1,812 | 141.3 | 246.5 | Liquid | 18.0 | 18.6 | | 311.7 | 74.8 | Do. |
| Decaglycerol hexaoleate | 2,340 | 153.9 | 148.1 | do | 19.1 | 19.7 | | 300.7 | 41.6 | Do. |

One or more of the hydroxy groups of the polyglycerol or the polyglycerol partial ester may be replaced with an amino group. In this manner the resultant amino derivative may undergo the characteristic reactions of amines or alcohols. Such derivatives are suitable as chemical intermediates, emulsifying agents in the manufacture of resins etc.

Alkylene oxide adducts may be formed by reaction with polyglycerol partial esters and such compounds have been found to be particularly suitable for use as emulsifiers, in edible applications, surfactants, textile anti-static agents, and in other industrial application.

Hydroxy acid adducts may be formed with polyglycerol esters and such compounds have been found to be particularly suitable for use as emulsifiers both in edible foods and in industrial applications. These hydroxy adducts have the following generic formula:

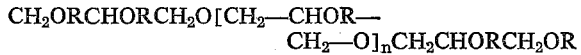

CH$_2$ORCHORCH$_2$O[CH$_2$—CHOR—CH$_2$—O]$_n$CH$_2$CHORCH$_2$OR wherein R is a radical selected from the group consisting of hydrogen acyl radicals of carboxylic acids having between 2 and 24 carbon atoms and acyl radicals of hydroxy carboxylic acids and wherein at least one of said R groups is an acyl radical of hydroxy carboxylic acids and wherein n is an integer from 0 to 28. Among the hydroxy carboxylic acids which may be reacted with the polyglycerols are: alpha-hydroxy-monocarboxylic acids such as lactic acid; beta-hydroxy dicarboxylic acids such as malic acid; alpha-beta dicarboxylic acids such as tartaric acid; beta-hydroxy-tricarboxylic acids such as citric acid; beta-hydroxy-monocarboxylic acids such as beta-hydroxy-butyric acid. For example the polyglycerol partial esters set forth in Table III above have been reacted with one or more mols of hydroxy acids such as lactic, citric and tartaric. The resulting derivatives and their physical properties are set forth in Table IX below.

for determining the physical and chemical properties of the compounds analyzed are as follows:

Physical/chemical property:        Test method
Hydroxyl number _____ AOCA Cd 13–60.
Viscosity (cstks.) _____ Cannon-Fenske-Ostwald type tubes.
Acid number _____ AOCS Ca 5a–40.
Saponification value _____ AOCS Cd 3–25.
pH _____ 3% dispersion at 25° C.
Iodine value _____ AOCS Cs 1–25.
Percent free glycerine _____ T.G.A. Method No. 26.
Percent monoglyceride _____ Ibid.
Specific gravity _____ AOCS Cc 10a–25 (liquids); AOCS Cs 10b–25 (solids).
Melting point _____ AOCS Cc 1–25 (closed capillary). AOCS Cc 2–38 (Wiley).
FFA (free fatty acids) _____ AOCS Ca 5a–40.
Smoke, fire, flash points _____ AOCS Cc 9a–48.

For a more detailed understanding of the invention, reference should now be had to the following examples which are illustrative of the invention.

EXAMPLE 1

Preparation of pentaglycerol 465 parts of 99.5% glycerol is placed in a reaction vessel equipped with a mechanical agitator, a reflux condenser and a nitrogen inlet. Sodium hydroxide catalyst is added in the amount of about 4.5 parts. The mixture is heated to approximately 260° C. and water of reaction is allowed to distill off while maintaining a blanket of nitrogen or other inert gas in the reaction vessel.

When the theoretical 4 mols. of water of reaction have been obtained, the mixture is cooled rapidly while blanketed with inert gas. The resulting product is a viscous liquid of a yellow color and an acrid odor. To this crude

TABLE IX.—TYPICAL POLYGLYCEROL HYDROXY ACID ESTERS

| Compound | A # | Sap. # | OH # | Percent mono | Percent free glycerine |
|---|---|---|---|---|---|
| Triglycerol mono lacto-mono oleate | 4.0 | 169.8 | 239.9 | 31.7 | 2.0 |
| Triglycerol mono lacto-mono palmitate | 5.2 | 182.7 | 259.8 | 34.4 | 0.6 |
| Triglycerol mono lacto-mono oleo palmitate | 6.5 | 180.7 | 256.6 | 35.5 | 2.1 |
| Triglycerol mono lacto-mono sterate | 3.2 | 176.0 | 245.5 | 32.4 | .3 |
| Triglycerol mono lacto-mono oleo linoleate | 6.0 | 201.5 | 227.9 | 19.2 | 1.8 |
| Triglycerol sesqui lacto-mono sterate | 6.0 | 167.2 | 283.8 | 27.3 | 2.6 |
| Triglycerol sesqui lacto-mono caprylate | 9.0 | 312.7 | 570.8 | 35.7 | 10.2 |
| Triglycerol sesqui lacto-mono oleo palmitate | 6.0 | 207.5 | 265.8 | | |
| Triglycerol di lacto-mono oleate | 7.8 | 204.6 | 247.5 | 22.8 | 1.1 |
| Triacontaglycerol mono lacto-mono oleate | 2.4 | 105.4 | 524.0 | | |
| Triglycerol mono tartaro mono oleate | 4.6 | 163.1 | 253.6 | 33.8 | 2.2 |
| Triglycerol mono tartaro mono palmitate | 22.8 | 192.2 | 224.6 | 31.3 | 0.9 |
| Triglycerol mono tartaro mono stearate | 8.0 | 162.0 | 217.5 | 28.9 | 1.5 |
| Triglycerol mono citro mono oleate | 24.0 | 205.9 | 148.0 | 15.6 | 0.7 |
| Triglycerol mono citro mono palmitate | 25.4 | 218.6 | 153.5 | 14.8 | nil |
| Triglycerol citro mono stearate | 22.8 | 327.0 | 138.3 | 10.0 | 0.7 |
| Pentaglycerol mono lacto mono oleate | 38.6 | 176.3 | 278.0 | 24.4 | 1.2 |
| Pentaglycerol mono lacto mono stearate | 14.2 | 148.6 | 204.6 | 19.4 | 1.1 | pentaglycerol, 30% to 40% of distilled water is added, together with 2% to 3% of carbon black based on the weight of polyglycerol. The mixture is agitated at about 80° C. for 15 to 30 minutes and filtered. The distilled water is removed under low vacuum and gentle heating. The purified pentaglycerol is substantially odorless and practically water white in color. It has a specific gravity of 1.252, refractive index of 1.4856 and a viscosity of 430 centistokes at 180° F., and hydroxyl value of 1028.

EXAMPLE 2

Preparation of pentaglycerol tetraoleate 816 parts of the purified pentaglycerol of Example 1 is mixed with 2240 parts by weight of oleic acid in a suitable reaction vessel equipped as usual for esterification reactions. A reaction temperature is maintained between 190° and 215° C. for a sufficient length of time until the free fatty acid value has dropped to 9.6. The product is washed with brine, bleached, filtered and dried. The purified tetraoleate of pentaglycerol has a free fatty acid number of 9.6, a hydroxyl value of 121.9, and a saponification number of 162.1.

EXAMPLE 3

Preparation of triglycerol distearate

A triglycerol made as described in Example 1 in the amount of 900 parts by weight is mixed with 2240 parts of stearic acid. The temperature of reaction is maintained at 185° to 215° C. until the free fatty acid value has dropped to 1.8. The product is purified as described in Example 1.

EXAMPLE 4

A tetraglycerol made by the process of Example 1 in the amount of 1884 parts by weight is mixed with oleic acid in the amount of 1680 parts and is reacted in the usual manner at a range of temperatures of 195° to 220° C. until the free fatty acid value has dropped to 2.3. The product is purified as described in Example 2.

EXAMPLE 5

Preparation of octaglycerol monostearate 2240 parts by weight of octaglycerol are mixed with 1120 parts of stearic acid and the reaction is caused to take place at 190° to 205° C. for a sufficient length of time so that the free fatty acid value has dropped to 1.6. The product is then purified as described in Example 1.

EXAMPLE 6

Preparation of polyglycerol diacetate 1 mole of bleached pentaglycerol is mixed with 2 moles of acetic anhydride and the mixture is heated for 30 minutes at 130° to 150° C. under total reflux. The temperature is reduced to 120° C., a full vacuum is applied for 30 minutes to strip off 2 moles of acetic acid. The product is refined and bleached. It is a pale yellow liquid having a bland odor; it has f.f.a. of 0.3, a saponification number of 235.7, a hydroxyl value of 643.9, and a Butyro refractive index at 60° C. of 62.4.

EXAMPLE 7

Preparation of acetylated pentaglycerol tallow ester

A mixture is made of 1 mole of pentaglycerol tallow ester and 1 mole of acetic anhydride. It is heated for 30 minutes under total reflux at 130° to 150° C. One mole of acetic acid is stripped off at 120° C. under full vacuum for 30 minutes. The product is a light yellow paste having a bland odor. It has f.f.a. of 2.1, a hydroxyl value of 217.6 and an iodine value of 33.7 and a Butyro refractive index at 60° C. of 51.9.

EXAMPLE 8

Preparation of pentaglycerol corn oil ester

A mixture is made of 1800 parts of corn oil and an equal amount of bleached pentaglycerol with an alkaline catalyst. It is heated under a blanket of nitrogen to 250° C. under a 30 mm. vacuum, said temperature being maintained for 15 minutes, the glycerine released in the ester-interchange being distilled off. 0.8% of phosphoric acid is carefully added and the mass is cooled rapidly to 100° C. The product is bleached and filtered. The yield of ester is 85%. It is a pale yellow liquid having a bland odor. It has f.f.a. of 2.8, a saponification number of 133.2, and a hydroxyl value of 312.9.

EXAMPLE 9

Preparation of triacontaglycerol 2785 grams of 99% glycerine and 1.0% sodium hydroxide are heated to about 235° C. at 200 mm. pressure. The reaction is maintained under these conditions until the theoretical 550 grams of water of reaction have evolved. At this point the reaction is slowed down by cooling to about 225° C. and the reaction product is sampled at 15 minute intervals for hydroxyl value. When the hydroxyl value approaches 803 the reaction mass is cooled to stop the reaction at about 100° C. under a nitrogen blanket. The resultant product is diluted with 200% by weight of water and 10% activated carbon, and bleached under agitation for about 30 minutes at 80 to 100° C. The product is vacuum filtered and then vacuum dried to remove water. The final product has a hydroxyl value of 802.8 and a viscosity at 150° F. of 9800 centistokes.

EXAMPLE 10

Preparation of tetradecaglycerol 1297 grams of 99% glycerine and 14 grams sodium hydroxide are charged into a 5-liter flask equipped with mechanical agitator, thermometer, column, and nitrogen blanket. The reaction charge is heated to about 260–265° C., maintaining the head temperature below 105° C. When the theoretical 243 grams of water of reaction have evolved, the reaction charge is cooled to about 250° C. and sampled at 15-minute intervals for hydroxyl value. When the hydroxyl value approached 846, the reaction is stopped by cooling to 100° C. under nitrogen blanket. The reaction product is diluted with 100% by weight of water. Activated carbon in an amount of 10% by weight is added to the diluted product. The product is bleached, vacuum filtered and dried in the usual manner. The final product has a hydroxyl value of 854 and a viscosity of 4893 centistokes at 150° F.

EXAMPLE 11

Preparation of diglycerol tetraacetate

Charge 600 grams diglycerol (3.6 moles) and 8 grams concentrated phosphoric acid (to neutralize catalyst in diglycerol) into a 3-liter flask, equipped with mechanical agitator, dropping funnel, thermometer, reflux column, under nitrogen blanket. The reaction charge is heated to 90° C. under total reflux. 1530 grams of acetic anhydride (15 moles—0.6 mole excess) is added to the reaction charge slowly since the reaction is exothermic. The reaction mass is maintained under total reflux for about 2 hours at 130 to 150° C. The excess acetic acid is distilled off at about 120 to 135° C. by slowly reducing the pressure. The resulting product is steam deodorized at 120° C. for about 2 hours at 5 mm. pressure and then bleached with carbon (1%) under vacuum at 80 to 100° C. and finally vacuum filtered. The final product has a free fatty acid (as oleic) of 0.25; hydroxyl number of 5.5; saponification value of 665.4; and Gardner color value of 4+.

EXAMPLE 12

Preparation of diglycerol mono arachido behenate

Charge 500 grams diglycerol (3.0 moles) and 960 grams arachidic-behenic acid (3.0 moles) into a 3-liter flask, equipped with agitator, under a nitrogen blanket. The reaction charge is heated to about 190° C. or until water of esterification is evolved; then slowly heated to about 250 to 255° C. keeping the head temperature below 105° C. 5 grams of 85% phosphoric acid dissolved in 5 grams of water is carefully added to the reaction charge when the head temperature goes below 100° C. Vacuum (200 mm. pressure) is introduced and maintained until free fatty acid content falls below 2.0 percent. At this point, the reaction charge cooled to about 180° C., steam deodorized at 5 mm. pressure for about 2 hours; bleached with carbon and vacuum filtered at about 80° C. The final product has a free fatty acid (f.f.a.) of 0.5; hydroxyl number of 260.4; saponification value of 123.2; and a Gardner color value of 8.

EXAMPLE 13

Triacontaglycerol dotriacontaacetate preparation 1120 grams triacontaglycerol (0.5 mole) and 14 grams concentrated phosphoric acid (to neutralize the catalyst in the triacontaglycerol) are charged into a 5-liter flask equipped with mechanical agitator, reflux column, under nitrogen blanket. The reaction charge is heated to about 90 to 95° C. with agitation. 1735 grams of acetic anhydride (17 moles—1 mole excess) are added to the reaction charge slowly since the reaction is exothermic. The reaction is maintained under total reflux at about 130 to 135° C. for about 2 hours. The product is deodorized, bleached, and filtered in the usual manner. The final product has an f.f.a.=0.13; OH value=2.4, Sap. #=494.7; and color=5 (Gardner).

EXAMPLE 14

Preparation of triacontaglycerol nona rapeseed stearine ester

Charge 1.5 moles rapeseed stearine (1350 grams), 0.5 mole triacontaglyercol (1120 grams), and 0.1% by weight of sodium hydroxide into a three liter flask equipped with short-path ester takeoff, meachanical agitator, and thermometer, under nitrogen blanket. The reaction charge is heated under full vacuum (about 5 mm. pressure) to about 235° C. and maintained at this temperature for about 15 minutes to strip off glycerine. The reaction charge is neutralized to a pH of 5–6.5 by the addition of phosphoric acid. The reaction product is deodorized, bleached, and filtered in the usual manner. The final product has an f.f.a.=2.9; hydroxyl number (OH value)=325.4; saponification value (Sap. #)=107.6, and a color of 7 (Gardner).

EXAMPLE 15

Preparation of pentaglycerol dilinoleate 776 grams pentaglycerol (2 moles), 1120 grams safflower fatty acids (4 moles), and 8 grams of phosphoric acid are charged into a 3-liter flask. The reaction is caused to take place at about 250° C. for a sufficient length of time until the free fatty acid drops to less than three. The product is deodorized, bleached, and filtered in the usual manner. The final product has an f.f.a.=2.7; OH value=355.6; Sap. #=116.4; and color value of 7 (Gardner).

EXAMPLE 16

Preparation of pentaglycerol heptastearate

Charge 582 grams pentaglycol (1.5 mole), 3400 grams stearic acid (12 moles—1.5 moles excess), and 6 grams concentrated phosphoric acid into a 5-liter flask and heat reaction charge to 185° C. under nitrogen blanket or until water of esterification is evolved. The reaction charge is then slowly heated to about 250–255° C., keeping the head temperature below 105° C. When the head temperature drops below 100° C. vacuum is introduced slowly to about 200 mm. pressure and maintained for about 4 hours or until the water of esterification ceases. The reaction mass is cooled to about 210° C. and steam deodorized for about 3 hours, further cooled to about 100° C. and bleached with carbon and vacuum filtered. The final product has an f.f.a.=0.09; OH value=6.7; Sap. #=173.1; and a color value of 4+ (Gardner).

EXAMPLE 17

Preparation of decaglycerol dodecaisodecanoate (oxo acid)

A reaction mixture consisting of 380 grains decaglycerol (0.5 mole), 1085 grams isodecanoic acid (6.3 moles), and 0.15% zinc dust catalyst is heated to about 250° C. while maintaining the head temperature below 110° C. Vacuum is introduced and the pressure is slowly reduced to about 300 mm. when the head temperature approaches 100° C. The reaction mixture is kept at these conditions until the f.f.a. falls below 3. The reaction product is then cooled and refined in the usual manner. The final product has an f.f.a.=0.18; OH value=10.7; Sap. #=252.4; and a color value of 4 (Gardner).

EXAMPLE 18

Decaglycerol tetracaprylate 1520 grams decaglycerol (2.0 moles) and 1150 grams caprylic acid (8 moles) are mixed and the reaction mixture is heated to about 245–250° C. for a sufficient length of time until the free fatty acid falls below 3.14 grams of 85% phosphoric acid are added to achieve neutralization. The reaction product is steam deodorized, bleached, and filtered in the usual manner. The final product has an f.f.a.=3.5; OH value=356.4; Sap. #=172.7; and a color value=8 (Gardner).

EXAMPLE 19

Preparation of pentaglycerol trisafflower oil ester 1128 grams pentadecaglycerol (1 mole), 900 grams safflower oil (1 mole) and 0.1% sodium hydroxide are heated to about 245° C. under vacuum, and maintained at this temperature for about 30 minutes to strip off glycerine. The reaction mass is neutralized to a pH of about 5–6.5, steam deodorized at about 5 mm. pressure at about 170° C. for approximately 2 hours, bleached and filtered. The final product has an f.f.a.=2.5; OH value=354.2; Sap. #=94.5; and a Gardner color value=8+.

EXAMPLE 20

Preparation of pentadecaglycerol heptadecacaprylate 564 grams pentadecaglycerol (0.5 mole), 1300 grams caprylic acid (9 moles), and 6 grams phosphoric acid are charged into a 3-liter flask. Esterification is allowed to take place at about 250° C., keeping the head temperature below 110° C. Vacuum is introduced slowly, and at 300 mm. pressure at a heat temperature below 100° C., the esterification reaction is continued for about 3 more hours. The reaction mass is cooled to about 200° C., deodorized, bleached, and filtered in the usual manner.

EXAMPLE 21

Eicosaglycerol dimyristate 750 grams eicosaglycerol (0.5 mole) and 228 grams myristic acid (1 mole) are mixed and heated to about 250° C., allowing esterification to continue for a sufficient length of time until the free fatty acid value drops below 1. The product is cooled and refined in the usual manner. The final product has an f.f.a.=0.9; OH value=644.5; Sap. #=56.9; and a Gardner color value=9+.

EXAMPLE 22

Preparation of eicosaglycerol docosa neoheptanoate-pelargonate

Charge 750 grams eicosaglycerol (0.5 mole) and 1690 grams neoheptanoic acid (13 moles—2 moles excess) into a 3-liter flask equipped with mechanical agitator, column, and under nitrogen blanket. The reaction charge is heated to about 250° C. allowing esterification to take place. The head temperature is kept below 105° C. When it drops to below 100° C., a partial vacuum is introduced and the esterification reaction is continued for about 10 hours. 240 grams pelargonic acid was added to the reaction mixture to completely esterify the eicosaglycerol. Esterification was allowed to take place at about 255° C. for about 6 hours, and the reaction mass was steam deodorized at 5 mm. pressure for about 4 hours. The product was bleached and filtered in the usual manner. The final product has an f.f.a.=0.07; OH value=5.8; Sap. #=303.4; and a Gardner color value=4.

What is claimed is:

1. In the process of preparing polyglycerol including preparation of crude polyglycerol by condensation of glycerol in the presence of an alkaline catalyst in an anhydrous medium at a temperature of at least 100° C., the improvement which comprises cooling the reaction mass, adding water in an amount in the range of one-third to several times the amount of polyglycerol formed in the reaction, adding a sufficient amount of a solid bleaching agent taken from the class consisting of carbon black, activated clays and bleaching earths to said mixture to cause bleaching and bleaching said polyglycerol at a temperature above room temperature and below 100° C.

2. A process according to claim 1 in which the amount of added water is up to twice the amount of said polyglycerol.

3. A process according to claim 1 in which the amount of added water is about equal to about 50% to 100% of the amount of a polyglycerol formed in the reaction, and about 1 to 15% of a solid bleaching agent.

4. A process according to claim 1 in which the bleached product is separated from said water, mixed with fatty acids having between 2 and 24 carbon atoms and the mixture heated to an elevated temperature below the decomposition point of the constituents to form esters of said polyglycerols.

5. A process according to claim 1 in which the added water is removed by stripping the water from the bleached polyglycerol by applying vacuum and heat to the product.

6. A process according to claim 1 in which the polymerization is in the presence of an alkaline catalyst, the amount of added water is up to twice the amount of said polyglycerol, the amount of added water is about equal to about 50% to 100% of the amount of a polyglycerol formed in the reaction, and about 1 to 15% of a solid bleaching agent, the bleached product is separated from said water, mixed with fatty acids having between 2 and 24 carbon atoms and the mixture heated to an elevated temperature below the decomposition point of the constituents to form esters of said polyglycerols, the polyglycerol contains from about 2 to 30 glycerol molecules, said bleaching agent is carbon black, and the added water is removed by gentle heating and low vacuum.

7. A process of purifying crude polyglycerol according to claim 1 which comprises adding thereto an amount of water equal to about 30% to 100% of said polyglycerol, heating said mixture to a temperature substantially above room temperature and below 100° C. in the presence of a bleaching agent in the amount of about 1% to 15% of said polyglycerol for a sufficient time to bleach said polyglycerol while agitating said mixture, then removing water therefrom at a relatively low temperature by distillation so as to avoid color formation in said product.

8. A process according to claim 7 characterized in that the amount of water is about 30% to 40%, the bleaching agent is carbon black in the amount of about 2% to 3%, the temperature is about 80° C., the time is about 15 to 30 minutes, the distillation is under low vacuum, the filtration is at said elevated temperature, and the polyglycerol has from 2 to 30 glycerol molecules.

References Cited

UNITED STATES PATENTS

| | | |
|---|---|---|
| Re. 21,322 | 1/1940 | Harris. |
| 2,213,477 | 9/1940 | Steindroff et al. |
| 2,258,892 | 10/1941 | Harris. |
| 2,496,582 | 2/1950 | Enyeart. |

OTHER REFERENCES

Miner et al.: "Glycerol," Reinhold Publishing Corp., New York (1953), TP 973 M5, p. 368.

LEWIS GOTTS, Primary Examiner

D. G. RIVERS, Assistant Examiner

U.S. Cl. X.R.

99—118 R, 122 M, 134 R, 139; 106—308 F; 252—52 R, 56 S; 260—77.5 AP, 404, 404.5, 408, 484 B, 484 R, 487, 488 J, 584 C, 615 R; 424—65, 312, 365